(12) United States Patent
Wu et al.

(10) Patent No.: US 10,817,112 B2
(45) Date of Patent: Oct. 27, 2020

(54) MOISTURE COMPENSATING CAPACITIVE SENSING CIRCUIT

(71) Applicant: NXP USA, INC., Austin, TX (US)

(72) Inventors: Xiaolei Wu, Tianjin (CN); Ting Wang, Suzhou (CN); Yonggang Chen, Suzhou (CN)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/237,728

(22) Filed: Jan. 1, 2019

(65) Prior Publication Data

US 2019/0346961 A1 Nov. 14, 2019

(30) Foreign Application Priority Data

May 9, 2018 (CN) .......................... 2018 1 0436255

(51) Int. Cl.
*G06F 3/041* (2006.01)
*G06F 3/0488* (2013.01)
*G06F 3/044* (2006.01)

(52) U.S. Cl.
CPC ............ *G06F 3/0418* (2013.01); *G06F 3/044* (2013.01); *G06F 3/0488* (2013.01)

(58) Field of Classification Search
CPC ...... G06F 3/0418; G06F 3/044; G06F 3/0488; G06F 3/0443; G06F 3/041661
See application file for complete search history.

(56) References Cited

U.S. PATENT DOCUMENTS

| | | | |
|---|---|---|---|
| 8,295,599 B2 | 10/2012 | Katougi et al. |
| 8,395,599 B2 | 3/2013 | Souchkov |
| 8,717,331 B2 | 5/2014 | Kremin |
| 8,902,172 B2 | 12/2014 | Peng et al. |
| 9,001,083 B2 | 4/2015 | Wadia |
| 9,310,934 B2 | 4/2016 | Ng et al. |
| 9,612,686 B2 | 4/2017 | Qiu et al. |
| 9,684,418 B1 | 6/2017 | Hills et al. |

*Primary Examiner* — Aneeta Yodichkas

(57) ABSTRACT

A capacitive sensing circuit includes circuitry to compensate for moisture or liquid spanning sensor units. The capacitive sensing circuit includes input terminals that couple with respective sensor units to receive sensing signals. A sensing block determines capacitance changes in the sensor units using the sensing signals and generates output signals indicative of the sensed capacitance changes. First switches are coupled with respective ones of the input terminals and are closed during a first scanning stage to couple the sensing signals from the input terminals collectively to the sensing block. Second switches are coupled with respective ones of the input terminals and are closed during a second scanning stage, to generate compensation signals to compensate for capacitance interference between the sensor units.

19 Claims, 5 Drawing Sheets

MOISTURE COMPENSATING CAPACITIVE SENSING CIRCUIT

BACKGROUND

The present invention generally relates to a capacitive sensing circuit and a corresponding method, and, more particularly, to a moisture compensating capacitive sensor.

Touch sensors are used in various applications, such as Graphical User Interfaces (GUIs) for receiving user inputs. Touch sensors operate with different measured physical quantities to determine user actions. A capacitive sensor measures capacitive differences between when the sensor is or is not touched by a user. A touch or a slide action is detected when the capacitive differences measured exceed a threshold.

FIG. 1 is a schematic diagram of a conventional touch sensor 100. The touch sensor 100 includes a plurality of sensor units 102 to 118 arranged in an array. Each of the sensor units 102-118 is surrounded by a number of neighboring sensor units. For example, sensor unit 102 is surrounded by sensor units 104 to 118. Each sensor unit is coupled to a processor that enables scanning and sensing operations. The processor applies scanning signals to the sensor units, and the sensor units generate output signals in response to the scanning signals. The output signals indicate the capacitance of the sensor units with respect to a ground voltage level. If any of the sensor units are touched, a capacitance change is reflected by the output signals, which the processor uses to determine whether a touch has occurred. Frequencies of the scanning signals and sizes of the sensor units are configured to have an acceptable trade-off amongst controllability, cost, and accuracy.

When the touch sensor 100 is operating in a wet or moist environment or when there is water on the user's finger, a touched sensor unit may be connected with a neighboring sensor unit through either the moisture in the air or water dropped on the touch sensor, which makes it difficult to determine which sensor unit has actually been touched.

To prevent false touches, the touch sensor 100 further includes shields 120 that surround each of the sensor units 102 to 118. The shields 120 cut-off potential electrical connections between neighboring sensor units, so that the output signals from the sensor units are identifiable. However, the shields 120 consume extra area and increase cost.

SUMMARY

This summary is provided to introduce a selection of concepts in a simplified form that are further described below in the Detailed Description. This summary is not intended to identify key or essential features of the claimed subject matter, nor is it intended to be used to limit the scope of the claimed subject matter.

In one embodiment, the present invention provides a capacitive sensing circuit. The capacitive sensing circuit includes input terminals configured to couple with respective sensor units to receive respective sensing signals, a sensing block, and pluralities of first and second switches. The sensing block determines a capacitance change in response to the sensing signals and generates an output signal indicative of the sensed capacitance change. The first switches are coupled with respective ones of the input terminals, and are closed during a first scanning stage, to couple the sensing signals from the input terminals collectively to the sensing block. The second switches are coupled with respective ones of the input terminals, and are closed during a second scanning stage, to provide compensation signals to compensate for capacitive interference between the sensor units.

In another embodiment, the present invention provides a method of sensing capacitance changes of a capacitive sensor, where the capacitive sensor includes a plurality of sensor units. The method includes, during a first scanning stage, coupling the sensor units with a sensing block, and then providing, collectively, by way of the sensor units, sensing signals to the sensing block. A change in capacitance is determined using the collective sensing signals. During a second scanning stage, compensation signals are provided to the sensor units in response to a determined capacitance change. The compensation signals compensate for capacitive differences between the sensor units.

In yet another embodiment, the present invention provides a method of sensing capacitive changes in a capacitive sensor. The method includes triggering a cluster of sensor units of the capacitive sensor with a first scanning signal. The cluster of sensor units comprises a central sensor unit and multiple peripheral sensor units. The method further includes providing, collectively from the cluster of sensor units, a first sensing signal in response to the first scanning signal, and determining a capacitance change in the cluster of sensor units based on the first sensing signal. The central sensor unit is triggered with a second scanning signal in response to a determined capacitive change in the cluster of sensor units. Compensation signals are applied to the peripheral sensor units to compensate for capacitances between the central sensor unit and the peripheral sensor units. The central sensor unit provides a second sensing signal in response to the second scanning signal, and determines a capacitance change in the central sensor unit based on the second sensing signal.

BRIEF DESCRIPTION OF THE DRAWINGS

So that the manner in which the above recited features of the present invention can be understood in detail, a more detailed description of the invention may be had by reference to embodiments, some of which are illustrated in the appended drawings. The appended drawings illustrate only typical embodiments of the invention and should not limit the scope of the invention, as the invention may have other equally effective embodiments. The drawings are for facilitating an understanding of the invention and thus are not necessarily drawn to scale. Advantages of the subject matter claimed will become apparent to those skilled in the art upon reading this description in conjunction with the accompanying drawings, in which like reference numerals have been used to designate like elements, and in which:

DETAILED DESCRIPTION

Figure 1:
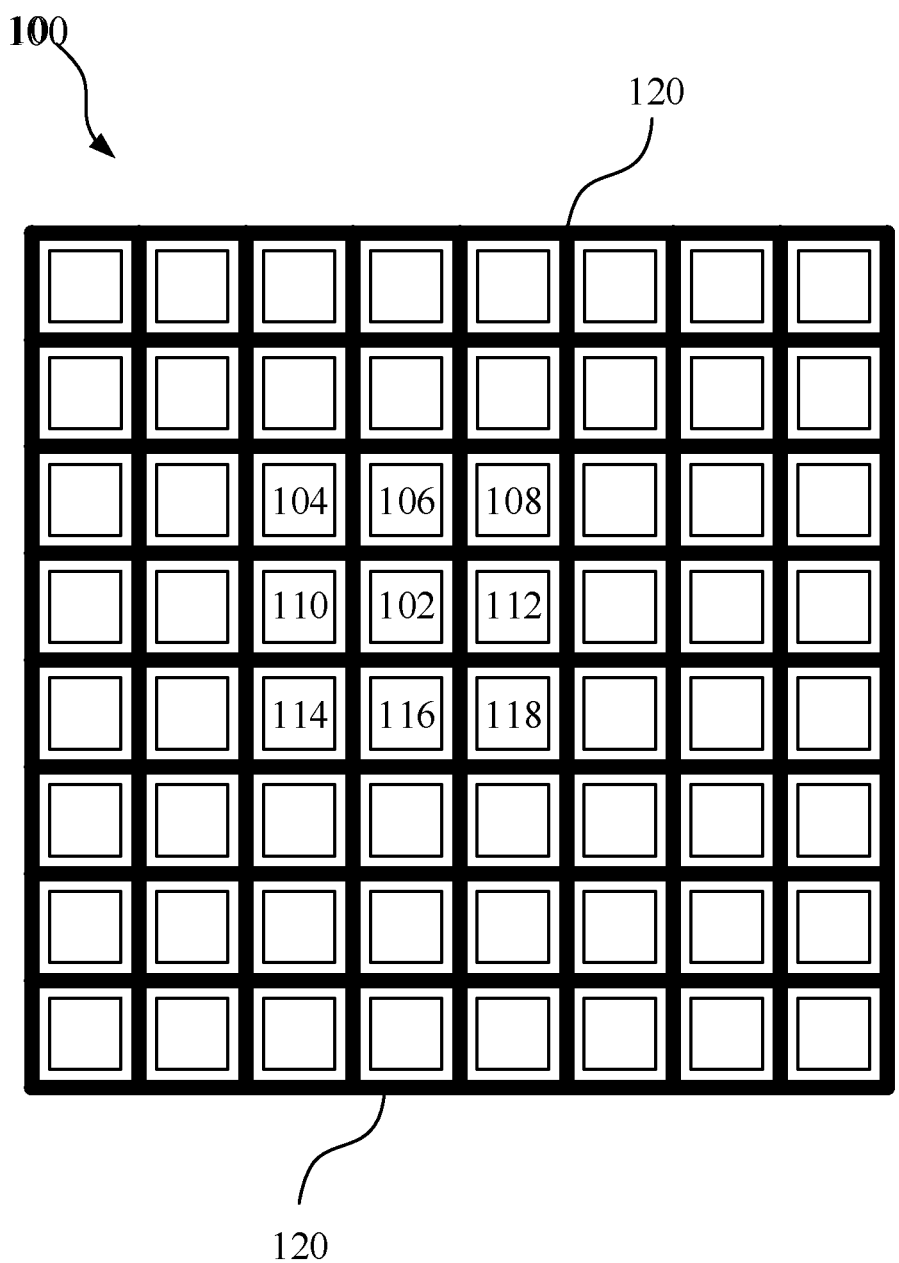
FIG. 1 is schematic diagram of a conventional touch sensor.
Figure 2:
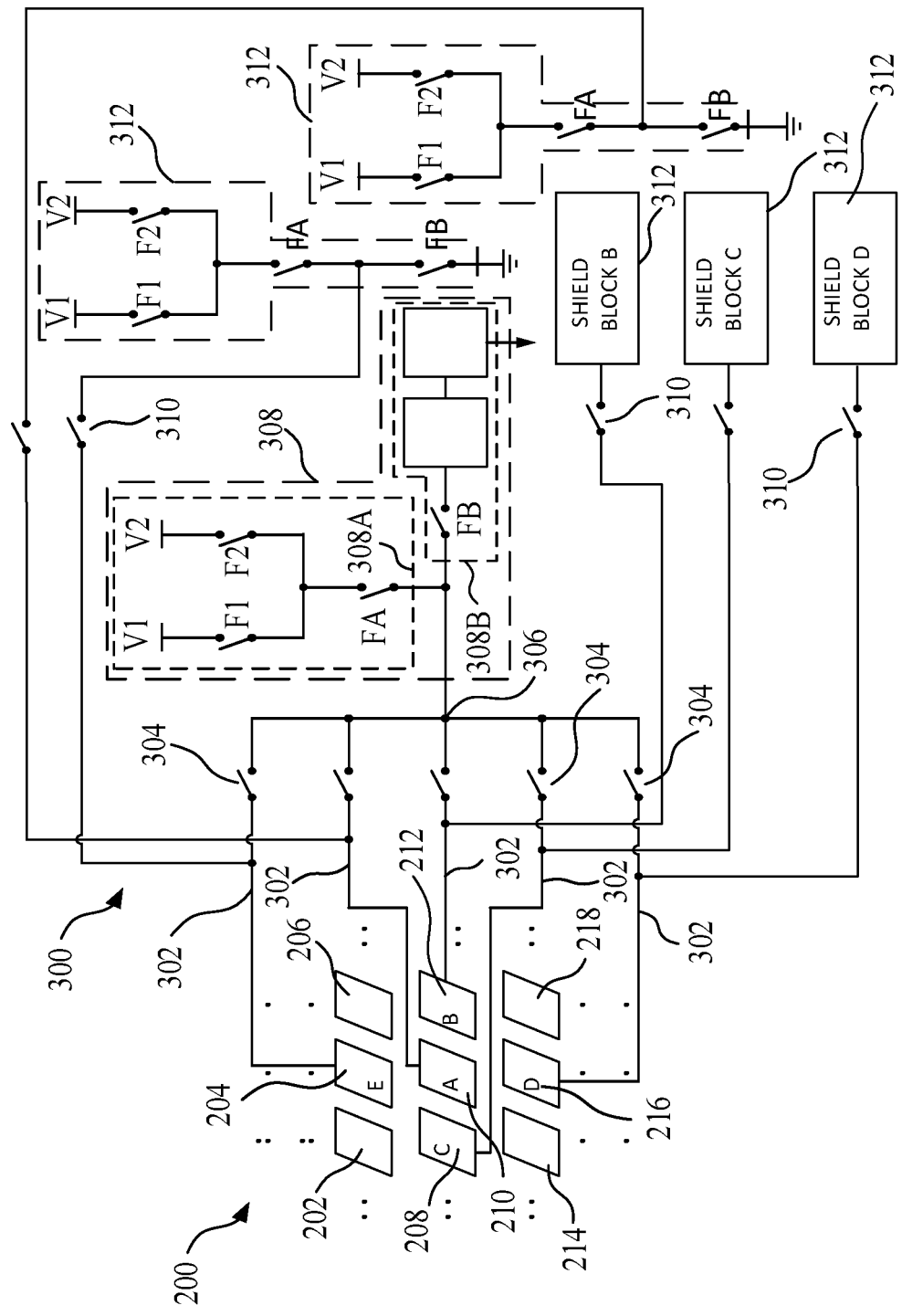
FIG. 2 is a schematic circuit diagram of a touch sensor and a capacitive sensing circuit according to an embodiment of the present invention.

FIG. 2 is a schematic diagram of a touch sensor 200 and a capacitive sensing circuit 300 in accordance with an exemplary embodiment. The touch sensor 200 includes multiple sensor units 202 to 218 arranged in an array. The size of the sensor units 202 to 218 can be configurable according to the granularity requirement of the application. It is shown in FIG. 2 that the sensor units are aligned vertically and horizontally. However, in alternative embodiments, the sensor units may be aligned differently, and the shape of the sensor units may be variable too. FIG. 2 shows nine (9) sensor units for easy illustration. However, in alternative embodiments, more or fewer sensor units may be included in the touch sensor 200.

The capacitive sensing circuit 300 includes a plurality of input terminals 302 that are respectively coupled with the sensor units 202 to 218, for providing scanning signals to the touch sensor 200 and receiving sensing signals triggered in response to the scanning signals. The capacitive sensing circuit 300 further includes a plurality of first switches 304 connected between the input terminals 302 and a common node 306. In operation, the first switches 304 are closed during a first scanning stage. When the first switches 304 are closed, the sensing signals are transmitted from the sensor units 202-218, collectively, to the common node 306.

The capacitive sensing circuit 300 includes a sensing block 308 coupled with the common node 306 for receiving the collective sensing signal from the sensor units 202-218. The sensing block 308 is configured to determine a capacitance change in response to the sensing signal. The capacitance change reflects an ambient change, such as a touch, a slide, or even a malfunction, on any one of or at least one of the sensor units 202-218. The sensing block 308 generates an output signal indicative of such sensed capacitance change. In an embodiment, the output signal is a digital signal.

FIG. 2 shows five of the sensor units 204, 208, 210, 212, and 216 coupled with the common node 306 through respective first switches 304. In alternative embodiments, more or fewer sensor units can be coupled to the common node 306. In the configuration shown, sensor unit 210 (labelled as sensor unit A) is a central sensor unit surrounded by peripheral sensor units 204, 208, 212, and 216 (respectively labelled as sensor units B, C, D, and E). The digital output signal generated by the sensing block 308 is processed to determine if a touch or a slide has occurred on a cluster of the coupling sensor units 204, 208, 210, 212, and 216. The sizes and the shapes of the sensor units 204, 208, 210, 212, and 216 are configured such that a determined touch or slide based on the output signal is sufficient to indicate that such touch or slide occurred on one of the sensor units 204, 208, 210, 212, and 216.

A first scanning stage determines the occurrence of the touch or slide operation and a range that such operation happens, without determining an accurate position of the operation. The first scanning stage, also referred to as rough or coarse scanning stage, scans the touch sensor 200 in a cluster-by-cluster manner, which enlarges the scanning granularity, yet simplifies the structure of the sensing circuit 300. Further, the rough scanning stage does not require a high scanning frequency because of the enlarged scanning area, which saves power.

A second scanning stage is then performed to accurately determine the position of the touch or slide operation. The second scanning stage, also referred to as a fine or detailed scanning stage, scans for example the sensor units A, B, C, D, and E in the determined cluster. The scanning order can be configurable, such as by location or by probability. In one embodiment, the fine scan goes sequentially from the sensor unit 204 to the sensor units 208, 210, 212, and 216. In an alternative embodiment, the fine scan goes first from the sensor unit located in the middle of the cluster, which in FIG. 2 is sensor unit A, then the sensor units B, C, D, and E, which surround the centrally located sensor unit 210.

During the second scanning stage, at least one of the first switches 304 is closed to allow the sensor unit coupled thereto to provide the sensing signal to the sensing block 308, while the other first switches 304 that are coupled with sensor units that are not undergoing scanning are kept open. Alternatively, the second scanning stage is through other sensing blocks, without overlapping with the sensing block used for the coarse scanning. The sensing signal from the sensor unit undergoing the fine scanning is analyzed by the sensing block 308 to determine if a capacitance change has occurred. The sensing block 308 accordingly generates an output signal that indicates a position of the potential touch or slide operation. Since the first scanning stage determines the range of the touch or slide operation to be within a cluster of the sensor units, the second scanning stage does not need to scan all the sensor units of the touch sensor 200. Instead, the second scanning stage operates only on the determined cluster of sensor units, which saves considerable scanning time and power.

Since the second scanning is operated on one of the sensor units, the second scanning is faster than the first scanning, which further saves scanning time. Accordingly, a frequency of the second scanning, reflected by a frequency of the scanning signal during the second scanning stage, is higher than that of the first scanning stage, reflected by a frequency of the scanning signal during the first scanning stage. In response, a frequency of the sensing signals from the sensor units during the second scanning stage is higher than a frequency of the sensing signals provided by the sensor units during the first scanning stage.

Figure 3:
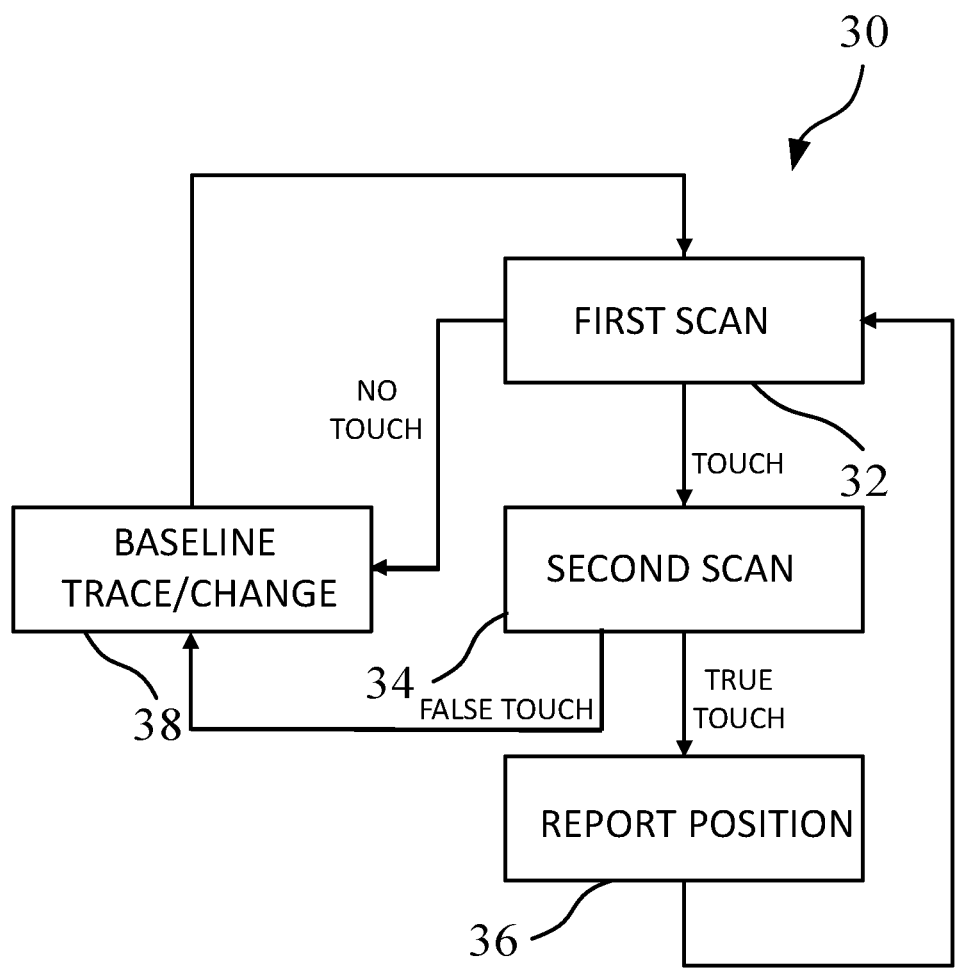
FIG. 3 is a flow chart of a method of capacitive sensing according to an embodiment of the present invention.

FIG. 3 is a flow chart of a method of capacitive sensing 30 in accordance with an exemplary embodiment. The method 30 is implemented using the capacitive sensing circuit 300 of FIG. 2. In alternative embodiments, the method is implemented on other applicable systems or circuits. The method 30 will be described herein with reference to the touch sensor 200 and the sensing circuit 300 of FIG. 2.

The method 30 starts with step 32, which is a first scanning stage. The first scanning stage is described above and includes closing the first switches 304 to couple the cluster of sensor units 204, 208, 210, 212, and 216 with the common node 306, providing scanning signals to the cluster of sensor units, transmitting first sensing signals from the cluster of sensor units collectively to the sensing block 308, and generating a first output signal in response to the collective first sensing signal.

If a touch or slide operation is detected based on the first output signal from the sensing block 308, then the coarse scanning step 32 is followed by step 34, which indicates performing a second scanning stage. The second scanning stage is the fine scanning stage, as described above, and includes opening the first switches 304 except the one coupling with the sensor unit that is undergoing the second scanning, providing the scanning signal through the closed first switch 304 to a target sensor unit, passing a second sensing signal from the sensor unit to the sensing block 308, and generating a second output signal in response to the second sensing signal. If a touch or slide operation is detected based on the second output signal from the sensing block 308, the method goes to step 36, which indicates the sensor unit to be the position where the touch occurred. After step 36, the method loops back to step 32.

On the other hand, if step 32 determines that there was no touch on any of the designated cluster of sensor units, the method 30 either repeats step 32 for another round of rough scanning, or to an optional step 38 that dynamically adjusts the baseline of scanning and determination. Similarly, at step 34, if no touch on any of the designated cluster of sensor units is detected, the method 30 either loops back to step 32 for another round of rough scanning, or to an optional step 38 that dynamically adjusts the baseline of scanning and determination. In one of embodiment, the baseline change step 38 can include: adjusting the voltage of the scanning signals, adjusting a threshold for the output signals to determine a touch or slide operation, etc.

Generally, a capacitive touch sensor unit includes a capacitor. One plate of the capacitor receives a scanning signal, while the other plate is coupled to a reference. The capacitance of the capacitor changes in response to a touch, as is known. The capacitance change results in a change in the sensing signal, which is triggered by the scanning signal. The capacitance change can be detected by measuring the sensing signal.

To measure the sensing signals, the sensing block 308 includes a charger 308A and a detector 308B, both of which are connected to the common node 306. The charger 308A provides the scanning signals to the touch sensor 200, while the detector 308B receives the sensing signals from the touch sensor 200. In the current embodiment, the charger 308A alternately provides a first charging signal and a second charging signal respectively from a first signal source V1 and a second signal source V2 to the touch sensor 200. The first signal source V1 provides the first charging signal at a first voltage level during a first charging step, and the second signal source V2 provides the second charging signal at a second voltage level during a subsequent second step.

The charger 308A includes a charger switch FA, while the detector 308B includes a detector switch FB. The charger 308A also includes first and second source switches F1 and F2, which respectively connect the charger switch FA to the first and second signal sources V1 and V2.

The detector 308B includes the detector switch FB that, when closed, couples the sensing signals into a detecting circuit (not labeled). The detecting circuit in the current embodiment converts the sensing signals into digital signals, and provides the digital signals as the output signals.

Figure 4:
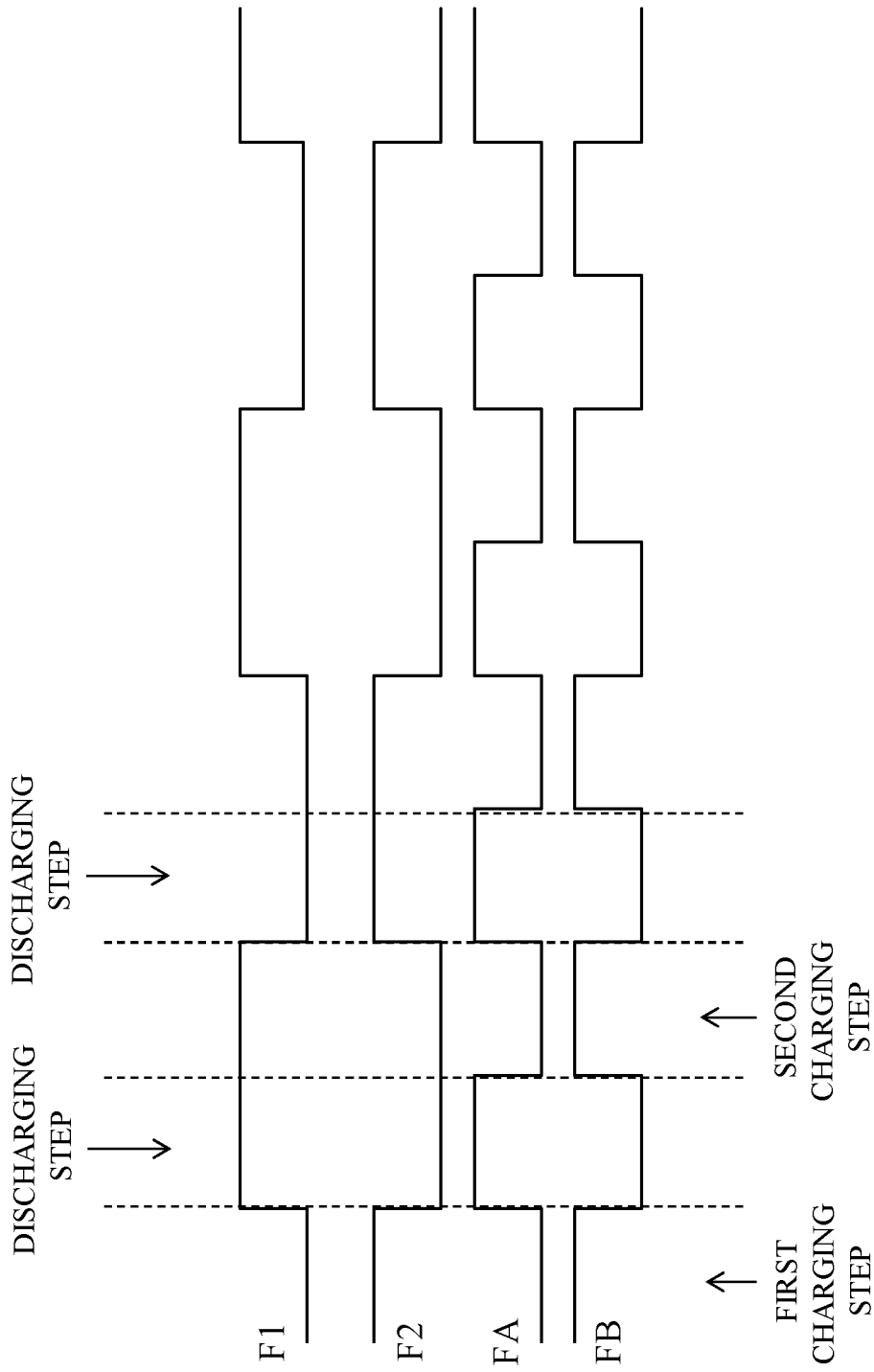
FIG. 4 is a wave form diagram showing switching of the switches of the capacitive sensing circuit of FIG. 2.

With reference to FIG. 4, in the first charging step, the charger switch FA and the first source switch F1 are closed, which allows the first charging signal (from V1) to charge the sensor units of the touch sensor 200 to the first voltage level; while the detector switch FB and the second source switch F2 are open. Subsequently, during a first discharging step, the charger switch FA is opened while the detector switch FB is closed, the sensor units discharge and provide the sensing signals from the discharging of the sensor units to the detector 308B. The charger switch FA and the second source switch F2 are then closed in a second charging step, to allow the second charging signal (from V2) to charge the sensor units to the second voltage level. Subsequently, in a second discharging step, the charger switch FA is opened and the detector switch FB is closed, while the first source switch F1 is closed and the second source switch F2 is opened, to allow the sensor units to provide the sensing signals to the detector 308B. In a presently preferred embodiment, the first voltage level V1 is higher than the second voltage level V2. The process is repeated starting with the first charging step.

The switches FA, FB, F1 and F2, and the first and second switches 304 and 310 are controlled by control signals received from a processor (not shown). In some embodiments, the switches FA, FB, F1, and F2 are implemented as transistors, transmission gates, or combinations thereof. If the switches are implemented using transistors, for example, the processor provides the control signals to the transistors to make the transistors conductive or non-conductive, so that the switches are closed or opened.

Referring back to FIG. 2, when there is a drop of water, for example, covering the touch sensor 200, or when the environment is very humid, resulting in interference between neighboring sensor units, such as an electrical connection between the capacitor plates of neighboring sensor units, the touch or slide operation on one of the sensor units will cause a capacitance change not only on the touched sensor unit, but also on that adjacent sensor unit. It is possible to incorrectly determine this adjacent sensor unit to have been touched, although there is no actual operation thereon.

The capacitive sensing circuit 300 includes a plurality of second switches 310 that are respectively coupled with the input terminals 302 on one side and respective compensation blocks 312 on their other sides. The compensation blocks 312, also referred to as shield blocks, provide compensation signals to the coupled sensor units to compensate for capacitive interference between the sensor units.

The compensation of the capacitive interference is conducted when the coarse scanning has detected a touch operation on the cluster of sensor units. In response to the detected capacitance change during the first, course scanning stage, the second switches 310 are closed to transmit the compensation signals generated by the shield blocks 312 to the sensor units.

Each of the compensation blocks 312 includes the signal sources V1 and V2 and switches F1, F2 and FA similar to those in the charger 308A, and the detector switch FB of the detector 308B. The operation of the switches in the compensation blocks 312 is the same as that described above for the sensing block 308. During the second scanning stage, the applications of the compensation signals keep in pace with the scanning signal, which means the operation of the switches in the compensation blocks 312 is synchronized with the operation of the switches in the sensing block 308, as shown in and explained with reference to FIG. 4.

Figure 5:
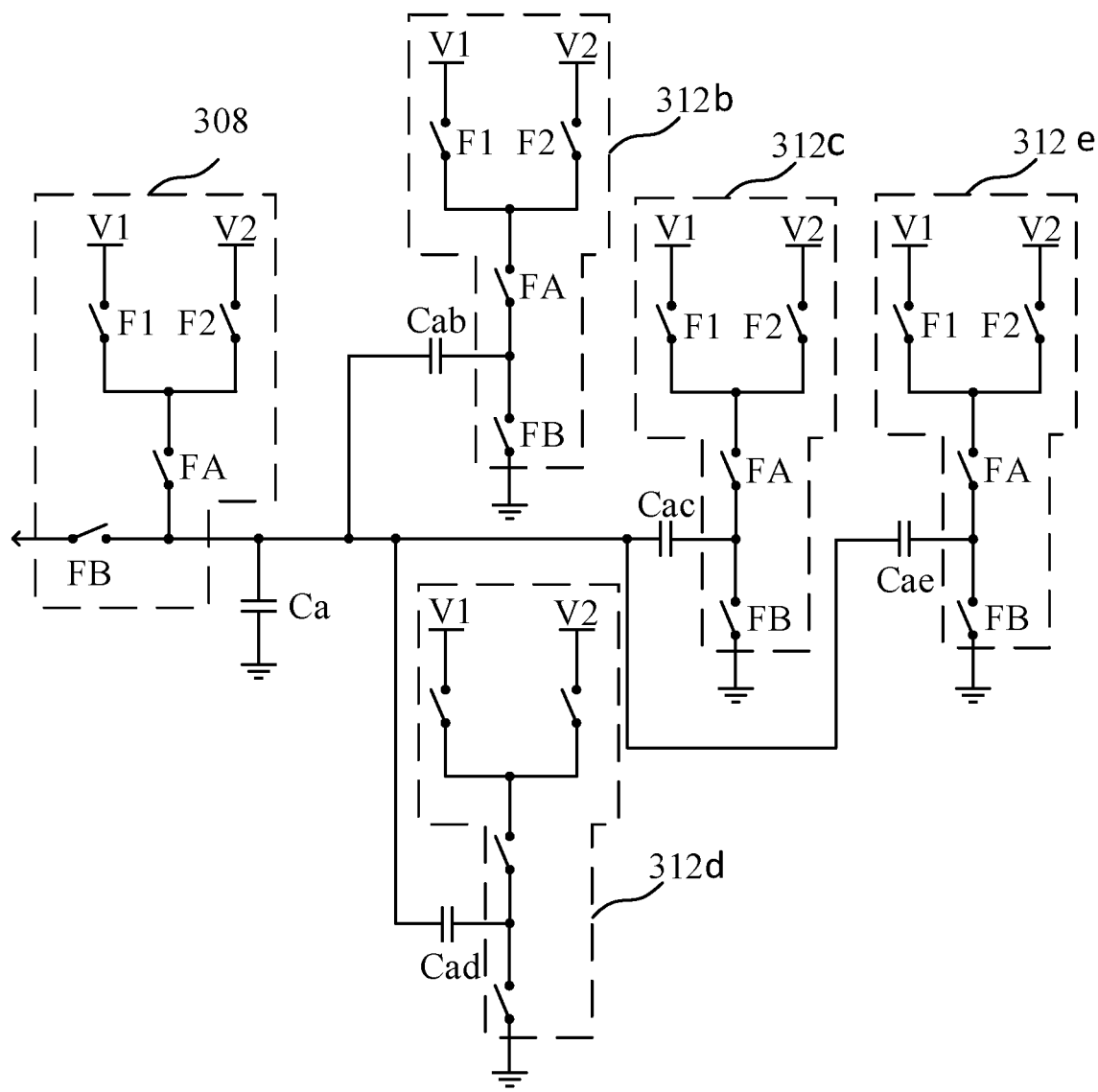
FIG. 5 is an equivalent circuit diagram of the compensation block and the interference capacitances during the second scanning stage of FIG. 2.

FIG. 5 shows an equivalent circuit diagram of the sensing block 308 and the compensation blocks 312, including interference capacitances during the second scanning stage. In FIG. 5, a sensor unit 210 (sensor unit A in FIG. 2), which has a capacitance $C_a$ is being scanned. However, due to interference, as described above, there are interference capacitances $C_{ab}$, $C_{ac}$, $C_{ad}$, and $C_{ae}$ between the scanning sensor unit A and the neighboring sensor units B, C, D and E, as illustrated. The compensation blocks 312b, 312c, 312d and 312e provide the compensation signals to the sensor units (units B, C, D and E), to compensate for the interference capacitances $C_{ab}$, $C_{ac}$, $C_{ad}$, and $C_{ae}$, so that these interference capacitances do not impact the capacitance $C_a$ or a potential change due to the touch operation thereon. Generally, if there is a connection between neighboring sensor units caused by, for example, a drop of water, the equivalence will be that the capacitor plate of the sensor unit undergoing scanning is expanded to include the capacitor plate of the neighboring sensor unit. As a result, the capacitance of the sensor unit being scanned will be double. As shown in FIG. 5, the compensation signals from the first and second voltage sources V1 and V2 are applied to the neighboring sensor units. The compensation signals are similar to the scanning signal applied to the scanning target sensor unit $C_a$. It is thereby possible to compensate for the interference capacitances brought about by neighboring sensor unit connections. On the other hand, if no connection or interference exists between the neighboring sensor units, the application of the compensation signal will not impact the scanning because the one of the neighboring sensor units is isolated from the scanning sensor unit. A sensing signal provided by the sensor unit under scanning, indicated by $C_a$, in response to the scanning signal is accordingly given by:

$$I_{chr} = (fC_aV_1 - (fC_{ab}V_1 + fC_{ac}V_1 + fC_{ad}V_1 + fC_{ae}V_1 + \ldots)) - (fC_aV_2 - (fC_{ab}V_2 + fC_{ac}V_2 + fC_{ad}V_2 + fC_{ae}V_2 + \ldots))$$

where $I_{chr}$ is the current of the sensing signal, f is the frequency of the scanning signal and the compensation signal; $C_{ab}$, $C_{ac}$, $C_{ad}$, and $C_{ae}$ are interference capacitances, $C_a$ is the capacitance of the scanning target sensor unit, and $V_1$ and $V_2$ are the voltages of the scanning signals and compensation signals from the first and second voltage sources V1 and V2.

The number of compensation blocks 312 is configurable depending on the arrangement of the sensor units of the touch sensor 200, the accuracy requirement, and the drive capability of the voltage sources. In the embodiment shown in FIG. 2, one of the sensor units 210 (i.e., unit A) has four (4) neighboring sensor units 204, 208, 212, and 216 (also labeled as B, C, D and E), which means that four compensation blocks 312 are possible to provide the compensation. However, in alternative embodiments, more or fewer compensation blocks may be used depending on any accuracy requirements. In an embodiment where the sensor units are aligned in a different way, the number of sensor units that surround a central sensor unit may vary such that the corresponding number of compensation blocks similarly varies. However, the compensation blocks are rather compact because they do not require every sensor unit to be equipped with a compensation block, instead the number of compensation blocks is at most equal to the number of the neighboring sensor units of one target sensor unit.

In embodiments where the voltage sources V1 and V2 have strong driving capabilities, fewer or even just one compensation block is possible to provide the compensation. It is understandable that, because the compensation blocks 312 have similar structure and configuration as that of the charger 308A and detector switch FB of the sensing block 308, if the sensing block 308 and a coupled bus have adequate drive capability, it is also possible to use the sensing block 308 as the compensation block 312, which will further simplify the structure.

It can now be seen from the embodiments that the capacitive sensing circuit compensates for potential capacitance interference between a scanning target sensor unit and its neighboring sensor units, which cancels the negative impact due to such interference and ensures the scanning of the sensor units to be accurate. The touch sensor and the corresponding capacitive sensing is robust against ambient impact even there is waterdrop. Accordingly, the touch sensor does not require the additional isolation means, which make the touch sensor more compact and reduces size, and further enables the touch sensing to be refine.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are intended merely to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

The invention claimed is:

1. A capacitive sensing circuit connected to a plurality of sensor units, the sensing circuit comprising:
   a plurality of input terminals connected to respective ones of the plurality of sensor units to receive sensing signals therefrom, and to transmit a plurality of scanning signals thereto;
   a sensing block connected to the plurality of input terminals by way of a common node for receiving the sensing signals, wherein the sensing block is configured to determine a capacitance change of the sensor units in response to the sensing signals, and to generate an output signal indicative of the sensed capacitance change;
   a plurality of first switches connected between the common node and respective ones of the plurality of input terminals, wherein the first switches are closed during a first scanning stage, to transmit the sensing signals from the input terminals, collectively, to the sensing block;
   at least one compensation block connected to the sensor units by way of the input terminals, wherein the compensation blocks generate compensation signals to compensate for capacitive interference between adjacent ones of the sensor units; and
   a plurality of second switches connected between the respective ones of the input terminals and the at least one compensation block, wherein the second switches are closed during a second scanning stage to provide the compensation signals to the sensor units.

2. The circuit of claim 1, wherein the sensing signals from the sensor units are coupled together by closing the first switches during the first scanning stage to detect a capacitance change from at least one of the sensor units.

3. The circuit of claim 2, wherein the second switches are closed in response to a detected capacitance change in the first scanning stage.

4. The circuit of claim 1, wherein at least one of the first switches is closed while the others of the plurality of first switches are open during the second scanning stage.

5. The circuit of claim 4, wherein the at least one the first switches that is closed during the second scanning stage is coupled with the corresponding input terminal that receives the sensing signal from the sensor unit located centrally in the plurality of sensor units.

6. The circuit of claim 5, wherein the first switches that are open during the second scanning stage are coupled with corresponding ones of the input terminals that receive the sensing signals from the sensor units surrounding the centrally located sensor unit.

7. The circuit of claim 1, wherein the sensing block provides a first charging signal and a second charging signal, respectively, in first and second steps of the scanning stages, to charge the sensor units to respective first and second voltage levels, wherein the sensor units provide the sensing signals by discharging from the first and second voltage levels.

8. The circuit of claim 7, wherein the second voltage level is lower than the first voltage level.

9. A method of sensing capacitance changes of a capacitive sensor, wherein the capacitive sensor comprises a plurality of sensor units, the method comprising:
during a first scanning stage, coupling the plurality of sensor units with a sensing block;
providing, by the plurality of sensor units, sensing signals collectively as a first sensing signal to the sensing block;
determining, by the sensing block, a capacitance change in response to the first sensing signal;
during a second scanning stage, providing compensation signals, by one or more compensation blocks, to the plurality of sensor units in response to a determined capacitance change, to compensate for capacitances between the plurality of sensor units; and
providing, by at least one of the plurality of sensor units, a second sensing signal to the sensing block.

10. The method of claim 9, wherein the providing sensing signals collectively as the first sensing signal to the sensing block during the first scanning stage comprises:
providing a first charging signal to the plurality of sensor units to charge the plurality of sensor units to a first voltage level;
generating the sensing signals by discharging the sensor units from the first voltage level;
providing a second charging signal to the plurality of sensor units to charge the plurality of sensor units to a second voltage level different from the first voltage level; and
generating the sensing signals by discharging the sensor units from the second voltage level.

11. The method of claim 9, wherein the providing the second sensing signal to the sensing block during the second scanning stage comprises:
providing a first charging signal to the at least one of the plurality of sensor units to charge the at least one of the plurality of sensor units to a first voltage level;
generating the second sensing signal by discharging the at least one of the plurality of sensor units from the first voltage level;
providing a second charging signal to the at least one of the plurality of sensor units to charge the at least one of the plurality of sensor units to a second voltage level different from the first voltage level; and
generating the second sensing signal by discharging the at least one of the plurality of sensor units from the second voltage level.

12. The method of claim 9, wherein
the providing the second sensing signal to the sensing block during the second scanning stage comprises providing the second sensing signal from a centrally located sensor unit; and
the providing the compensation signals to the sensor units comprises providing the compensation signals to the sensor units surrounding the centrally located sensor unit.

13. The method of claim 9, wherein:
providing the first sensing signal during the first scanning stage comprises providing the first sensing signal at a first frequency; and
providing the second sensing signal during the second scanning stage comprises providing the second sensing signal at a second frequency higher than the first frequency.

14. A method of sensing capacitance changes of a capacitive sensor, comprising:
triggering a cluster of sensor units of the capacitive sensor with a first scanning signal from a capacitive sensing circuit, wherein the cluster of sensor units comprises a central sensor unit and multiple peripheral sensor units that surround the central sensor unit;
providing, collectively from the cluster of sensor units to the capacitive sensing circuit, a first sensing signal in response to the first scanning signal;
determining, by a sensing block, a capacitance change in the cluster of sensor units based on the first sensing signal;
triggering the central sensor unit with a second scanning signal from the capacitive sensing circuit in response to a determined capacitance change in the cluster of sensor units;
applying, by one or more compensation blocks, compensation signals to the peripheral sensor units to compensate capacitances between the central sensor unit and the peripheral sensor units;
generating, by the central sensor unit, a second sensing signal in response to the second scanning signal; and
determining, by the sensing block, a capacitance change in the central sensor unit based on the second sensing signal.

15. The method of claim 14, wherein a frequency of the first scanning signal is lower than a frequency of the second scanning signal.

16. The method of claim 14, wherein the triggering the cluster of sensor units with the first scanning signal and the providing the first sensing signal comprise:
charging, with a first voltage signal, the cluster of sensor units to a first voltage level;
discharging the cluster of sensor units from the first voltage level to provide the first sensing signal;
charging, with a second voltage signal different from the first voltage signal, the cluster of sensor units to a second voltage level different from the first voltage level; and
discharging the cluster of sensor units from the second voltage level to provide the first sensing signal.

17. The method of claim 16, wherein second voltage level is less than the first voltage level.

18. The method of claim 14, wherein the triggering the central sensor unit with the second scanning signal and the providing the second sensing signal comprise:
   charging, with a first voltage signal, the central sensor unit to a first voltage level;
   discharging the central sensor unit from the first voltage level to provide the second sensing signal;
   charging, with a second voltage signal different from the first voltage signal, the central sensor unit to a second voltage level different from the first voltage level; and
   discharging the central sensor unit from the second voltage level to provide the second sensing signal.

19. The method of claim 18, wherein second voltage level is less than the first voltage level.

\* \* \* \* \*